United States Patent [19]

ElHatem et al.

[11] Patent Number: 4,853,718
[45] Date of Patent: Aug. 1, 1989

[54] ON CHIP CONDUCTIVE FLUID SENSING CIRCUIT

[75] Inventors: Abdul M. ElHatem, Hawthorne; Steven A. Buhler, Redondo Beach, both of Calif.

[73] Assignee: Xerox Corporation, Stamford, Conn.

[21] Appl. No.: 232,409

[22] Filed: Aug. 15, 1988

[51] Int. Cl.⁴ .............................................. G01D 15/16
[52] U.S. Cl. ........................... 346/140 R; 324/60 CD; 340/618
[58] Field of Search .................. 346/140; 324/60 CD; 340/618

[56] References Cited

U.S. PATENT DOCUMENTS 4,550,327 10/1985 Miyakawa ............................ 346/140
4,700,754 10/1987 Kringe ............................. 346/140 X

OTHER PUBLICATIONS

Phillips, D. W.; Capacitive Ink Level Detector, IBM TDB, vol. 16, No. 10, Mar. 1974, pp. 3293-3294.

Primary Examiner—Joseph W. Hartary
Attorney, Agent, or Firm—Robert E. Cunha

[57] ABSTRACT

The ink in an ink jet is sensed by a capacitor, one plate of which is coupled to ground through the ink. The absence of ink will appear as a decreased amount of capacitance. In this case the charge of the capacitor will leak off faster, and a sample and hold circuit can sense this to output a signal indicating the absence of ink. The charging signal can either be generated on the chip, which is made from silicon, or can be supplied to the chip. The number of pins on the chip taken for this sensing function can be minimized by multplexing the states of signals supplied to the chip for other purposes to generate the necessary signals to control and operate this sensor.

4 Claims, 7 Drawing Sheets

4,853,718

ON CHIP CONDUCTIVE FLUID SENSING CIRCUIT

BACKGROUND OF THE INVENTION

This is an ink sensor for an ink jet array and more specifically is a comparator circuit which uses the discharge time of the capacitance of the ink in the channels of an ink jet array, and an on chip capacitor, to sense the presence or absence of ink.

In an ink jet printer, if the jet array runs out of ink for any reason, the operator usually discovers it by noticing that the output pages are blank. Unless the operator is continually watching the output tray, an amount of time and wasted output may result.

The situation is more critical in a color copier which uses multiple colors to generate the output. It could easily happen that one of the three, four or more color ink jet arrays will run out of ink, but the printer would still be producing images, and the operator may not detect that the output is off-color. By the time the problem is discovered, the output of multiple runs may have been delivered to the customers. Nor can the output be saved. In most printers the colors must be laid down in the correct order. A color that is not deposited at the proper cycle in the printing process can not be put in later.

One solution is to place an ink sensor in the channel that leads from the main ink reservoir to the array. Thermisters have been used to detect the heat conduction characteristics of the surrounding fluid, the ink having a greater thermal conductivity that the air would have in the absence of ink. One problem with this apparatus is that, over time, deposits form on the thermister which cause it to give an erroneous output.

SUMMARY OF THE INVENTION

This invention assumes a "bubble jet" ink jet array formed on two surfaces of silicon. One surface has etched into it a relatively large cavity which forms the on-chip ink reservoir, a large channel leading from the reservoir to the ink supply, and an array of small channels connecting the reservoir to the ink jets. The other surface has integrated onto it the active devices required to implement the circuits which drive the jets, and the circuits required to implement a fluid sensor for each of the ink jets in the array. The two surfaces are then cemented together to form the complete ink jet device.

Each sensor is a capacitive sensor consisting of a conducting surface in electrical contact with the ink, an insulating layer, and a second conducting surface which is connected to the sensor circuit. The capacitor is charged to approximately three volts and then allowed to discharge. If there is ink in the channel, there will be a significant amount of capacitance sensed between the second conducting surface and ground, and the charge will leak off slowly. If there is no link in the channel, relatively little capacitance will be seen between the second conducting surface and ground, and the charge will leak off quickly. A sampling circuit designed to measure the voltage remaining on the sensing capacitor a certain time after the capacitor starts to discharge will then show whether there is ink in the channel.

Various waveshapes are required to enable the sensor, including the pulses needed to charge the capacitor and allow it to discharge, and the pulse determining the sampling timing. In one embodiment, these signals are supplied by the printer to the chip. A problem frequently arising in electronic devices in general, and in active bubble jet chips in particular, is that the large number of components on the chip results in the requirement for a large number of input and output pins to connect signals into and out from the chip. The chip becomes pin limited. Instead of supplying the signals required to start and end fluid sensing cycles, this invention generates these signals from the clock and data signals it is already receiving for other purposes by multiplexing the states of these signals. In this way, additional signals required by the chip are generated without the requirement for additional pins. Further, by supplying these signals at certain times, at the end of each printed line, for example, the system can test for ink and if a lack of ink is detected, shut off the printer at the end of the current line.

Another embodiment of this invention is the integration of a free running oscillator to generate the required clocks and all the active enabling circuitry for generating the fluid sensing signals on the chip itself. Since the chip is manufactured from silicon and has active components already, these additional circuits can also be integrated on the chip. In this case, the ink sensing can be continuous, with the printer shutting down whenever there is a detected lack of ink. The trade-off cost is the additional real estate required on the chip to be used for this function.

The sensing capacitor itself is inherently reliable in that the deposits that form from the ink onto the capacitor surface do not reduce its effectiveness. The capacitance of the capacitor does become reduced over the lifetime of the chip, but the voltage levels and components can be selected such that there will always remain a reliable differentiation between the presence and absence of ink.

With this device in the system, the lack of ink at any print head can be detected, the printer stopped, and the operator alerted immediately.

DESCRIPTION OF THE DRAWINGS

For a more complete understanding of the invention, reference may be had to the following detailed description of the invention in conjunction with the drawings wherein.

DETAILED DESCRIPTION OF THE INVENTION

Figure 1:
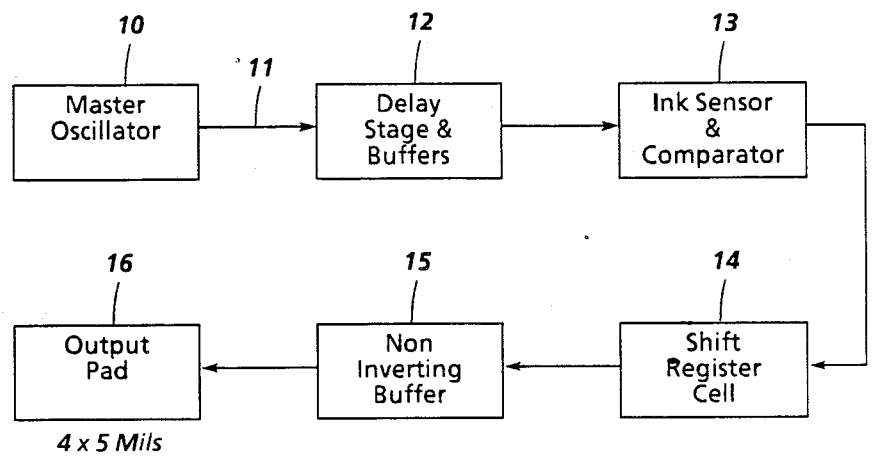
FIG. 1 is a block diagram of the ink sensor circuit.

FIG. 1 is an overall block diagram of the entire sensing circuit. The Master Oscillator 10 generates a first low frequency pulse on line 11. This output is further delayed and buffered at the buffer circuit 12 for final application to the capacitative sensor and comparator circuit in block 13. The comparator output is a high or low circuit which is latched into shift register cell 14. This circuit is buffered in block 15 and sent out to a 4 by 5 mil pad 16 as the final circuit output which is an indication to the system whether there is ink at the print head.

Figure 2:
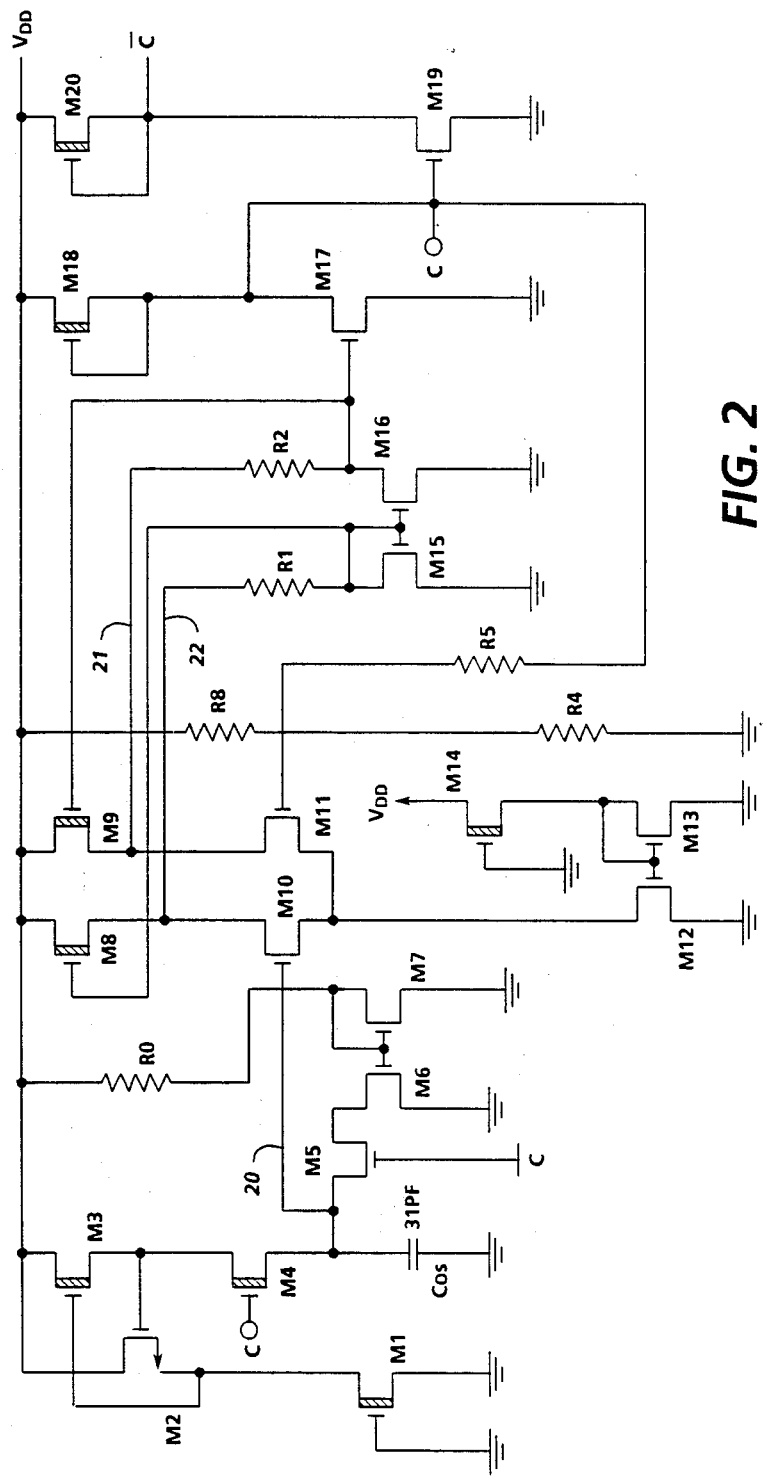
FIG. 2 is a schematic diagram of the master oscillator circuit.

FIG. 2 is a schematic of the oscillator which produces pulses of approximately 10 microseconds duration and at one millisecond intervals by alternately charging and discharging a large value capacitor Cos (31 pf). The slow period is attained by turning on transistor M4 by the application of clock pulse C, to charge the capacitor Cos at a very low current supplied by a depletion transistor M3 which has its gate bias set at one threshold less than its source by transistor M2. This charge time results in a slowly rising voltage at line 20. The discharge time of the same capacitor Cos is set by the current which is taken by a matched pair of transistors M6 M7 of 100 to 1 ratio, fed by resisitor R0. This results in a falling voltage at line 20, and is controlled by the Not C signal at the gate of M5, the Not C signal being the inverse of the C Signal.

The other transistors of this circuit make up a conventional NMOS operational amplifier with a balanced differential input to minimize offset, with one volt of input hysteresis. Resistors R3, 4 and 5 generate a fixed reference voltage which is applied to the gate of M11 which is one input of the differential amplifier. The voltage of capacitor Cos is applied to the gate of transistor M10 which is the other input to this differential amplifier. The differential output at the drains is applied on lines 21 and 22 to level shifters R1 and R2. Finally, the single ended output is taken from the drain of transistor M16 and amplified through the gain stages comprising transistors M17, 18, 19 and 20. The gain of the amplification stages produces a C signal at the drain of M17, which is coupled back to the gate of transistor M4 to sustain oscillation, and a Not C signal output at the common line between transistors M19 and M20 which is shown in this diagram as a node labelled with an encircled numeral 1 (node 1). This is the waveshape which is coupled back to the gate of transistor M5, and is also sent out to the input of the circuit of Figure 2.

Figure 3:
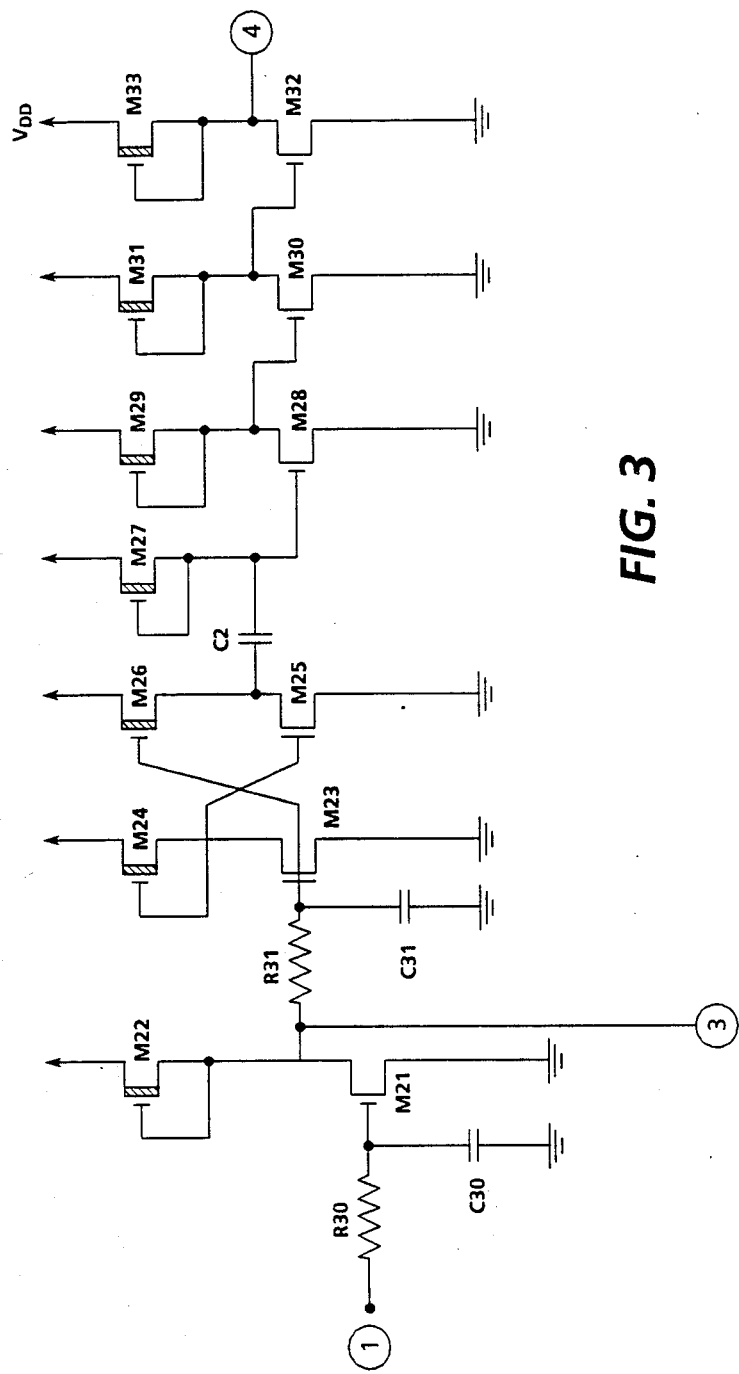
FIG. 3 is a schmetic diagram of the delay and beffer circuits.

This node 1 clock is applied to the first delay circuit of FIG. 3 comprising an input RC circuit of R30 and C30 and is then amplified and inverted by transistor M21, and a second delay circuit comprising RC circuit R31 and C31 and the buffer amplifier comprising transistors M23, M24, M25 and M26. The output of the first delay circuit is the node labelled by the encircled numeral 3 (node 3) and the output of the second delay circuit is applied to a one shot multivibrator comprising capacitor C2 and transistors M27, M28 and M29. The width of the pulse generated by the one-shot is approximately 100 nS and is set by a 2 pico farad capacitor C2 and a depletion transistor M27. Finally buffers M 30 through M33 comprising a buffer produce a third output clock, the output node of which is labelled as an encircled numeral 4 (node 4). All clocks have a period of one mS. The node 3 clock is an inverted and slightly delayed version of the node 1 clock. The node 4 clock has a pulse width of 400 nS and is slightly delayed from both other clocks.

Figure 4:
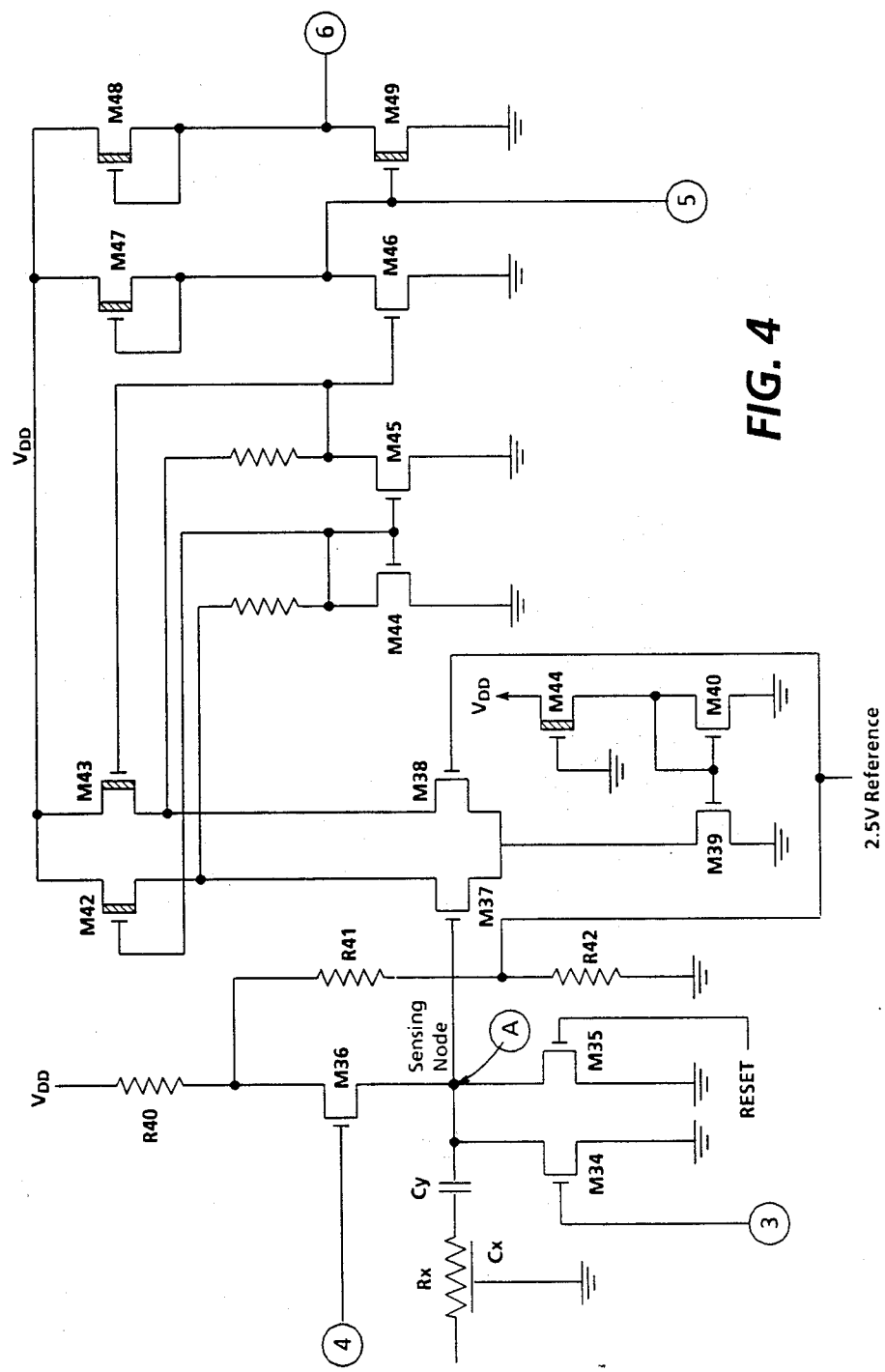
FIG. 4 is a schematic diagram of the sensor circuit.

FIG. 4 is the ink sensor and its associated circuitry. The sensing capacitor Cy comprises a layer of conducting polysilicon in contact with node A, an insulating dielectric layer and a conducting layer with an area of 165 square mils of polysilicon in contact with the ink. This capacitance is modified by oxide growth on the outer layer of conducting polysilicon. When the cartridge is first assembled this capacitor may be very large in value since its natural oxide may be only 20 to 50 Angstroms thick. As the contact ages, in the presence of the ink, additional oxide will grow on top of the polysilicon. The circuit will continue to function as additional oxide grows but it will become less and less sensitive. The thickness of oxide used as the upper bound when designing the sensor was 500 Angstroms, which would only be reached at the end of the useful life of the device. Then components where chosen from the remainder of the sensing circuit so that the circuit would continue to operate with this level of oxide. The simulated capacitance and resistance of the ink are shown as a resistor Rx and capacitor Cx. The presence of ink is determined by charging the sensing capacitor Cy, and then measuring the discharge time.

Resistive voltage divider R40, 41, 42 supplies three volts to transistor M36, which in turn is turned on by the pulse at node 4 to charge the sensing node, and therefore the sensing capacitor and the associated ink capacitance Cx, to three volts. After rapidly charging the capacitor, transistor M36 is cut off after 400 nS by the pulse at node 4, allowing the capacitor to float for 10 microseconds. If there is no ink, the capacitor will look like an open circuit from the sensing node, and the charge on the node will leak off rapidly. If there is ink, the node will see the large capacitance of the capacitor and the ink, and the charge will leak off slowly as a function of the large time constant produced by the large capacitance and the large resistance to ground. During the remainder of the one millisecond sensing cycle the sensing node is clamped to ground by the application of the node 3 pulse through transistor M34 and is fully discharged. There is an additional transistor M35 which connects a reset signal to the sensing node which is used only for testing at the time of manufacture.

This falling voltage waveshape is applied to an op amp configured as a comparator. A reference voltage of 2.5 volts is generated by resistor R42 and is applied to the gate of transistor M38 as the reference voltage, while the waveshape is applied to the gate of transistor M37. The waveshape falling below the reference is the indication that there is no ink, and a differential output will be generated at the drains of both transistors and applied to the remaining transistors M44 - M49 which constitute an amplification circuit with a single ended output at nodes 5 and 6. The final output at node 6 is latched out through a shift register and buffer circuit which is responsive to the node 5 and 6 pulses, and connected to a pad for off chip sensing. The ink sensor is continuously running and the output at the pad is held in the high or low state continuously, depending on the presence or absence of ink.

Figure 7:
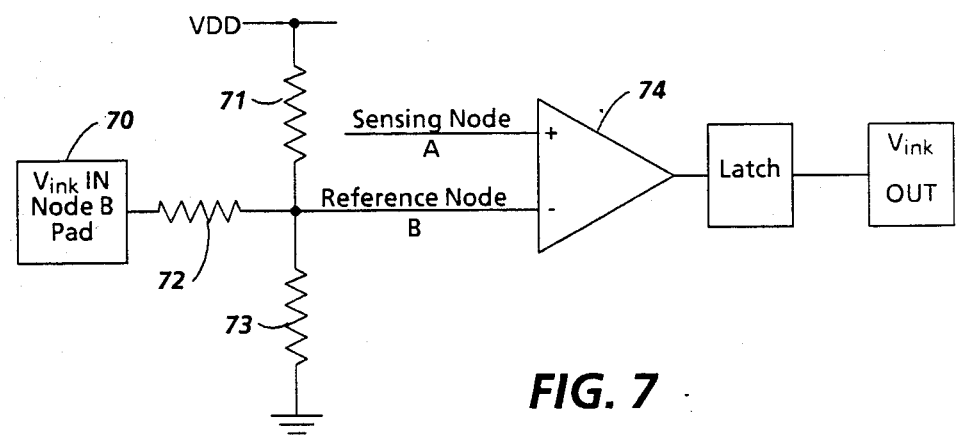
FIG. 7 is a simplified schenatic of a fluid sensor programmable resistor circuit network.

Over the lifetime of the chip, a thick layer of deposits from the ink may form on the sensing capacitor, and the capacitance may be reduced to the point where the sensor may erroneously sense a lack of ink. To compensate, the reference level of 2.5 volts applied to the gate of M38 of FIG. 4 may be increased through the use of the circuit of FIG. 7. A variable voltage supplied by the printer is applied to the pad 70, and coupled through the resistive network comprising Resistors R71, 72 and 73 to the reference node to the comparator 74, which is the equivalent of the comparator M37, 38 of FIG. 4. As in FIG. 4, the voltage at the ink sensing capacitor is applied to the other sensing node, is sampled and then is latched out as a high or low dc level.

It is recommended that the ink sensor output be used by the system only when the module is not firing, as between lines, since there will be noise coupled capacitatively into the ink by the 60 volt driver switching.

Figure 5:
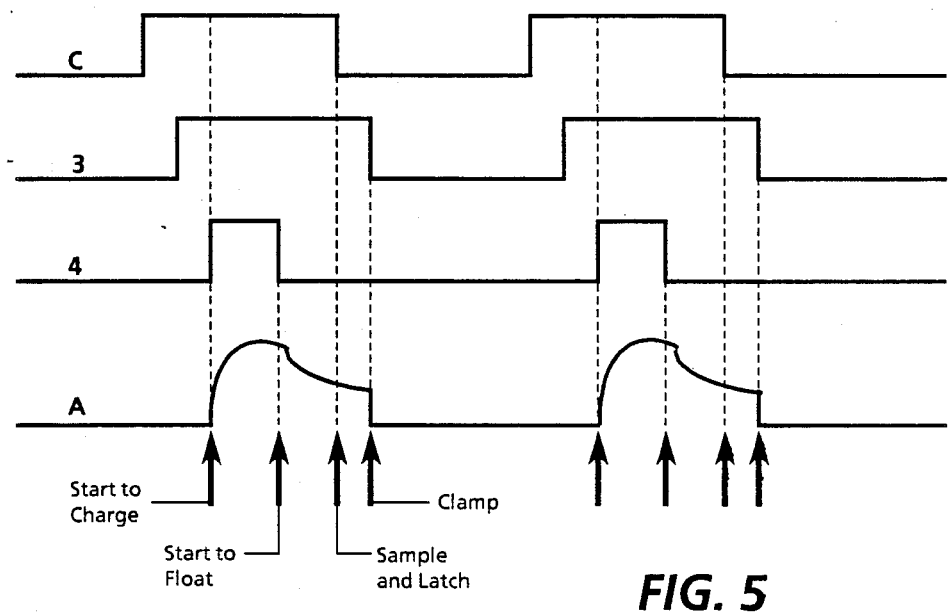
FIG. 5 is a timing diagram of the fluid sensing activating and testing clock waveforms that are generated on the chip.

The waveshapes for this circuit are shown in FIG. 5. The basic output of the master oscillator of FIG. 2 is shown as the node C waveshape. Besides being used to generate the other clocks, the negative going edge can be used as the time for the sample and hold time. Specifically, this edge is used to latch the output of the comparator into the output register. The node 3 waveshape is the node C pulse delayed and inverted, is generated in the circuit of FIG. 2 and is used to in the Figure 4 circuit to discharge node A after the ink sense sample time. The node 4 waveshape is the output of the circuit of FIG. 3 and is used in the circuit of FIG. 4 to charge node A. The node A waveshape represents the voltage on the sensing capacitor. During the Ton time it charges to three volts. At the end of that time it starts to float. Some time later it is sampled and latched, and finally it is clamped to ground by the action of the rising edge of the node 3 waveshape.

Figure 6:
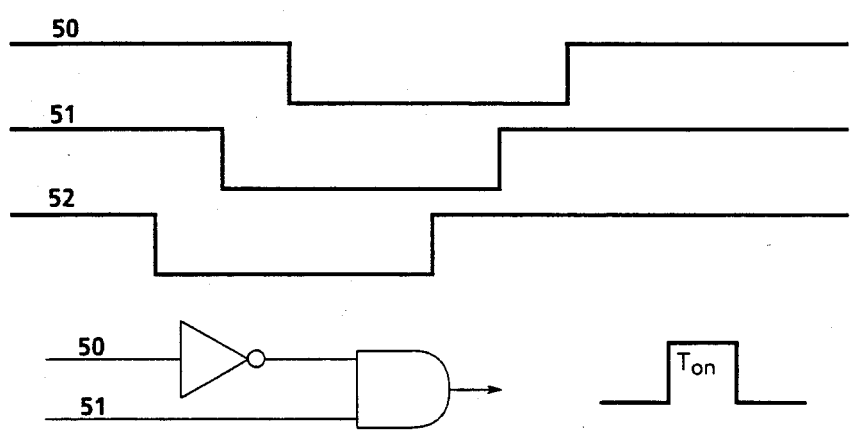
FIG. 6 is a simplified diagram showing the multiplexing of input signal states.

These waveshapes can be generated on the chip using the circuits described, but can also be generated by multiplexing the states of signals supplied from the printer for other purposes. For example, assume that data signals 50, 51 and 52 of FIG. 6 are already being supplied to the chip, but as shown, are not suitable for driving the sensing capacitor. If, as shown in FIG. 6, signal 50 were inverted and then ANDed with signal 51, the resultant signal can be used to charge the sensing capacitor. Likewise, the risetime of signal 52 can be used for the sample and hold timing. In this way, less circuitry need be integrated on the chip.

Figure 8:
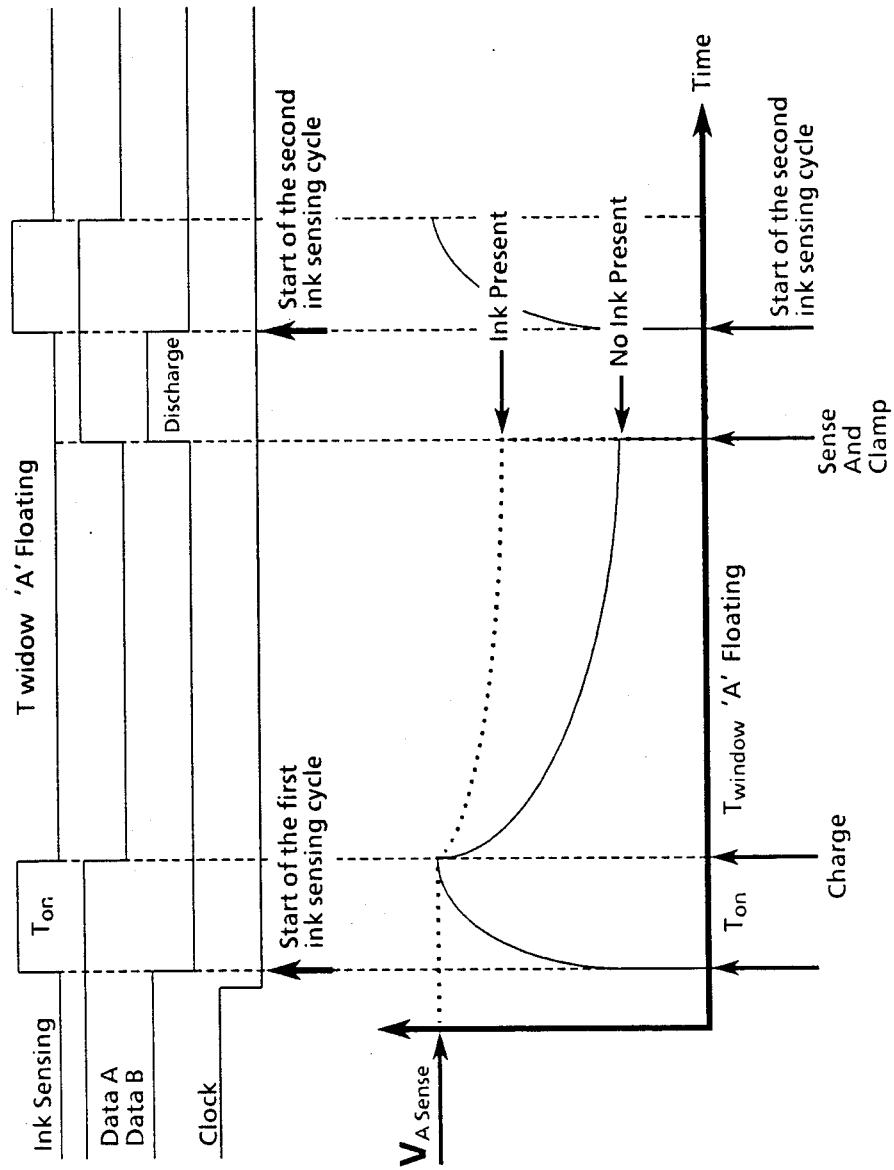
FIG. 8 is a timing diagram of the fluid sensing activating and testing clock waveforms that are generated from signals received from the printer.

FIG. 8 illustrates this process. Assume the Data signals A and B and a clock pulse are already being supplied to the chip, and that there is required an output whenever the clock pulse is low. Under these conditions a Ton signal can be constructed as a pulse which goes high whenever the Clock is low, the Data A signal is high and the Data B signal is low. The capacitance of the ink sensing sensor is charged during this Ton time. Further, the rise time of the Data B signal can be used as the time to sample and hold the sense voltage, and the sense voltage can be clamped to ground during the time that the data B waveshape is high.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In an ink jet printing system, an ink sensor in an ink jet array device comprising:

a capacitor comprising first and second conducting plates separated by a dielectric insulator, the area of said first plate electrically coupled to the ink, the second plate coupled resistively to ground, means for charging said capacitor by applying a voltage waveshape to said second plate for a first predetermined time, and means for determining the voltage remaining on said second plate a second predetermined time after the end of said first predetermined time, a higher voltage indicating the presence of ink, a lower voltage indicating an absence of ink.

2. The sensor of claim 1 wherein said ink jet array device is made from
    silicon and wherein said means for charging said capacitor is a circuit
    integrated on said silicon device.

3. The system of claim 1 wherein said system further comprises means for supplying data signals to said device, and wherein said device further comprises means for multiplexing states of said data signals received from said system to generate a waveshape for charging said capacitor.

4. The system of claim 1 wherein the means for determining comprises a comparator which compares the voltage remaining on said second plate after said predetermined time to a reference voltage, and wherein said reference voltage can be varied.

* * * * *